United States Patent
Han et al.

(10) Patent No.: US 10,489,598 B2
(45) Date of Patent: Nov. 26, 2019

(54) INFRASTRUCTURE DIAGNOSTIC SYSTEM AND METHOD

(71) Applicant: SAMSUNG SDS CO., LTD., Seoul (KR)

(72) Inventors: In Chul Han, Seoul (KR); Seung Youl Maeng, Seoul (KR); Sung Hwan Choi, Seoul (KR); Min Ho Sung, Seoul (KR); Ji Yun Lee, Seoul (KR); Do San Pyun, Seoul (KR); Young Beom Seo, Seoul (KR); Seong Dae Song, Seoul (KR); Eun Young Kim, Seoul (KR); Sung Soon Hong, Seoul (KR); Jeong A Choi, Seoul (KR); Yoo Mi Kwon, Seoul (KR); Chang Won Park, Seoul (KR); Mun Hwan Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 196 days.

(21) Appl. No.: 15/448,121

(22) Filed: Mar. 2, 2017

(65) Prior Publication Data

US 2018/0137287 A1    May 17, 2018

(30) Foreign Application Priority Data

Nov. 11, 2016    (KR) .......................... 10-2016-0150476

(51) Int. Cl.
G06F 21/57    (2013.01)
H04L 29/06    (2006.01)
G06Q 30/04    (2012.01)

(52) U.S. Cl.
CPC .......... *G06F 21/577* (2013.01); *G06Q 30/04* (2013.01); *H04L 63/1433* (2013.01); *G06F 2221/034* (2013.01)

(58) Field of Classification Search
CPC ............ G06F 21/577; G06F 2221/034; H04L 63/1433
See application file for complete search history.

(56) References Cited

U.S. PATENT DOCUMENTS 6,742,128 B1 *  5/2004  Joiner ................. H04L 63/1408
                                                        726/25
7,712,131 B1 *  5/2010  Lethe ...................... G06F 21/57
                                                        701/29.1
(Continued)

FOREIGN PATENT DOCUMENTS

KR    2002-0010346 A    2/2002
KR    2002-0042254 A    6/2002
(Continued)

*Primary Examiner* — Linglan E Edwards
(74) *Attorney, Agent, or Firm* — Sughrue Mion, PLLC

(57) ABSTRACT

A system for diagnosing and analyzing infrastructure, comprising: a storage unit storing a diagnostic script, which is for collecting system information from a target system or at least one target operating server of the target system; a script transmission unit transmitting the diagnostic script to the target system to diagnose the target system; a system information collection unit receiving the system information from the target system or the at least one target operating server as a result of the running of the diagnostic script; an analysis engine storage unit storing at least one analysis rule corresponding to the target system or the at least one target operating server; and an analysis information generation unit analyzing the system information by using the analysis rule, and generating analysis information regarding the target system and the at least one target operating server based on the results of the analyzing.

10 Claims, 17 Drawing Sheets

(56) References Cited

U.S. PATENT DOCUMENTS

| | | | | |
|---|---|---|---|---|
| 8,561,154 B2* | 10/2013 | Bunn | ................... | H04L 63/102 |
| | | | | 726/5 |
| 8,621,637 B2* | 12/2013 | Al-Harbi | ............. | H04L 63/1433 |
| | | | | 713/188 |
| 8,844,042 B2* | 9/2014 | Treit | ..................... | G06F 21/577 |
| | | | | 713/187 |
| 9,372,995 B2* | 6/2016 | Shigemoto | ............ | G06F 21/577 |
| 9,606,894 B2* | 3/2017 | Della Corte | ........ | G06F 11/3612 |
| 2006/0021028 A1* | 1/2006 | Brunette | ................ | G06F 21/57 |
| | | | | 726/22 |
| 2006/0085852 A1* | 4/2006 | Sima | .................... | G06F 21/552 |
| | | | | 726/22 |
| 2011/0314543 A1* | 12/2011 | Treit | .................... | G06F 21/577 |
| | | | | 726/23 |
| 2013/0219493 A1* | 8/2013 | Banzhof | ............. | H04L 63/1433 |
| | | | | 726/22 |
| 2013/0227698 A1* | 8/2013 | Taniguchi | ............. | G06F 21/554 |
| | | | | 726/25 |
| 2015/0347759 A1* | 12/2015 | Cabrera | ................ | G06F 21/577 |
| | | | | 726/25 |
| 2016/0359878 A1* | 12/2016 | Prasad | ................ | H04L 63/1425 |
| 2017/0192810 A1* | 7/2017 | Lukacs | ............... | G06F 9/44526 |

FOREIGN PATENT DOCUMENTS

| | | |
|---|---|---|
| KR | 2002-0096422 A | 12/2002 |
| KR | 10-2015-0039199 A | 4/2015 |

\* cited by examiner

FIG. 7

← Back to Diagnostic History List

Date & Time of Diagnosis : 2016/07/05 12:40

| Diagnostic Overview | Comprehensive Diagnostic Results | Sector-Specific Diagnostic Results | Action Guide |

"OPENTIDE IT Service Failure Preliminary Check" Diagnostic Results

---

Results of Maxigent diagnosis show that 17 devices are determined to be vulnerable with a diagnostic score of 50 points. There are some factors that can cause some serious problems, and there are also items that are not covered by required recommendations. So stabilization improvement is needed especially for OS/DBMS vulnerabilities How can I secure my equipment?

FIG. 8

| Diagnostic Fields | Target to be diagnosed | Quantity | Diagnosed Equipment |
|---|---|---|---|
| OS | WINDOWS | 5 | WINOWSR2_2012, WINDOWS_2007, WINDOWS_8 SERVE...and 2 more |
| | LINUX | 3 | LINUX_SERVER_1, LINUX_SERVER_2, LINUX_SERVER_3 |
| DBMS | ORACLE | 1 | LINUX_SERVER_3 |
| | SQL | 3 | SQL_SERVER_KT_IDC, SQLSERVER_SDS_IDC, SQLSERVER_SDASA_IDC |
| | POSTRESQL | 4 | SQL_SERVER_KT_IDC, SQLSERVER_SDS_IDC, SQLSERVER_and 1 more |
| VIRTUALIZATION | VMWARE | 1 | VMWARE_SERVER_1 |
| | SUM | 17 | |

Diagnostic Overview
The details of targets to be diagnosed for each diagnostic field are as follows.

FIG. 13

| | Total Number of Vulnerable Items | Short-Term Task | Medium-Term Task | Long-Term Task |
|---|---|---|---|---|
| Comprehensive Diagnostic Results<br>Results of MAXIGENT analysis are as follows | 32 | 21 | 6 | 5 |
| OS | 20 | 17 | 2 | 1 |
| DBMS | 10 | 3 | 3 | 4 |
| VIRTUALIZATION | 2 | 1 | 1 | 0 |

Short-Term Task? A task that can be performed immediately without additional investment
Medium-term Task? A task that does not incur any cost but requires the turning on or off of equipment
Long-term task? A task that requires investment, such as replacing equipment

FIG. 14

DB Analysis Results

| Solution/PJT Name | SDS Next-Generation Informatization PJT | DB Name | Common Operating DB |

System Overview ⊞

DB & Instance Information ⊞

Check Results   > Date of Analysis : 2016-08-08 14:32   > Collection Period : 2016-08-01 00:00 ~ 2016-08-05 23:50 (Peak : 08:00 ~ 17:00)

Checklist Check Results : Good 41 / Poor 1 / No Input 0 [Total 42 items]   |Definition of Inspection Result Level|

Total Score 90

According to DB performance check results, the current state is relatively favorable, some top SQL tuning and improvement are needed, and improvement on one unfavorable item (i.e., SQL (%) with long execution time) is also needed.

| Solution/PJT Name | | Unfavorable Item | Reviews | | Action Guide |
|---|---|---|---|---|---|
| | | | Measured Value (Recommended Value) | | |
| SQL Reuse Rate | Favorable 100% | Performance is relatively stable and partial improvement on top SQL and unfavorable items may be needed | | | |
| Date Reuse Rate | Favorable 100% | The average percentage of data blocks acquired from the memory without being read from the disk meets the recommended value. | | | |
| SQL Performance | Moderate 67% | Performance is moderate and worst SQL tuning and improvement are needed. | | | |
| | | SQL (%) with long execution time | 81.52% (40% or lower) | | |
| Transaction Queue/Contention | Favorable 100% | Oracle has a favorable percentage of standby time for writing an activity log or for entering/modifying/deleting data | | | |
| Solution/PJT Name | Favorable 100% | Reorg target table does not exist and disk read performance is good | | | |

INFRASTRUCTURE DIAGNOSTIC SYSTEM AND METHOD

This application claims priority to Korean Patent Application No. 10-2016-0150476, filed on Nov. 11, 2016, and all the benefits accruing therefrom under 35 U.S.C. § 119, the disclosure of which is incorporated herein by reference in its entirety.

BACKGROUND

1. Field

The present disclosure relates to an infrastructure diagnostic system and method, and more particularly, to a method and system for diagnosing information technology (IT) infrastructure such as a web server, a web application server (WAS), and a database (DB) server, providing a results report based on the results of the diagnosis, and providing a customized guide capable of addressing any vulnerabilities found by the diagnosis.

2. Description of the Related Art

Most small- to medium-size companies have their own information technology (IT) infrastructure for their business, such as, for example, servers for operating groupware or homepage servers for providing product information and manual files to general customers.

However, most small- to medium-size companies do not have the expertise to install or operate IT infrastructure. Therefore, it is difficult to run IT infrastructure stably and efficiently. For example, if faults or external attacks occur in their IT infrastructure, companies often ask an equipment supplier or a separate consulting firm to deal with the faults or the external attacks.

The equipment supplier, however, mostly provides limited one-time diagnostics only for a specific area. In other words, when a request for the diagnosis of infrastructure is made to the supplier of the relevant product, the supplier simply provides one-time diagnostics only on the product. Since the scope of this type of diagnostics is limited, it is difficult to provide analysis from an integrative perspective, especially when various servers are used, because each of the various servers needs to be diagnosed.

Conventionally, the diagnosis of IT infrastructure is performed mostly offline. However, offline diagnostics involves collecting data on-site, analyzing the collected data, and making plans or suggestions based on the results of the analysis and thus has disadvantages in terms of time and space.

Thus, a system and method for diagnosing IT infrastructure online, rather than offline, are needed. Particularly, an IT infrastructure diagnostic system and method capable of diagnosing and analyzing a variety of products comprehensively are needed.

SUMMARY

Exemplary embodiments of the present disclosure provide an infrastructure diagnostic system and method.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

In some embodiments, A system for diagnosing and analyzing infrastructure, comprising: a storage unit storing a diagnostic script, which is for collecting system information from a target system or at least one target operating server of the target system; a script transmission unit transmitting the diagnostic script to the target system to diagnose the target system; a system information collection unit receiving the system information from the target system or the at least one target operating server as a result of the running of the diagnostic script; an analysis engine storage unit storing at least one analysis rule corresponding to the target system or the at least one target operating server; and an analysis information generation unit analyzing the system information by using the analysis rule, and generating analysis information regarding the target system and the at least one target operating server based on the results of the analyzing.

In some embodiments, A diagnosis and analysis method of an infrastructure diagnostic system, comprising: receiving, by the infrastructure diagnostic system, identification (ID) information of a user who manages a target system including at least one target operating server; receiving, by the infrastructure diagnostic system, system information of the target system or the at least one target operating server; classifying, by the infrastructure diagnostic system, the target system or the at least one target operating server based on the system information according to predefined criteria; selecting an analysis module including at least one analysis rule corresponding to the target system or the at least one target operating server based on the results of the classification; and generating, by the infrastructure diagnostic system, analysis information regarding the target system or the at least one target operating server by executing the selected analysis module.

According to the aforementioned and other exemplary embodiments of the present disclosure, small and medium-size companies can inspect their own infrastructure with the use of a free diagnostic tool acquired from a web portal. In other words, simply by running the free diagnostic tool in each server of the IT infrastructure, the companies can identify the vulnerabilities of each server of their IT infrastructure and can be provided with a guide for addressing the identified vulnerabilities.

As a result, the IT infrastructure can be managed efficiently and stably without almost any time and space constraints, and without a waste of money and time. In addition, comprehensive diagnostics can be provided not only for a particular product, but also for various products from various suppliers, and diagnostic results can be provided accordingly. Moreover, each small- or medium-size company can be allowed to manage their own history of diagnosis.

Other features and exemplary embodiments may be apparent from the following detailed description, the drawings, and the claims.

BRIEF DESCRIPTION OF THE DRAWINGS

The above and other exemplary embodiments and features of the present disclosure will become more apparent by describing in detail exemplary embodiments thereof with reference to the attached drawings, in which:

FIGS. 7 through 14 are schematic views illustrating a results report according to an exemplary embodiment of the present disclosure;

DETAILED DESCRIPTION

Figure 1:
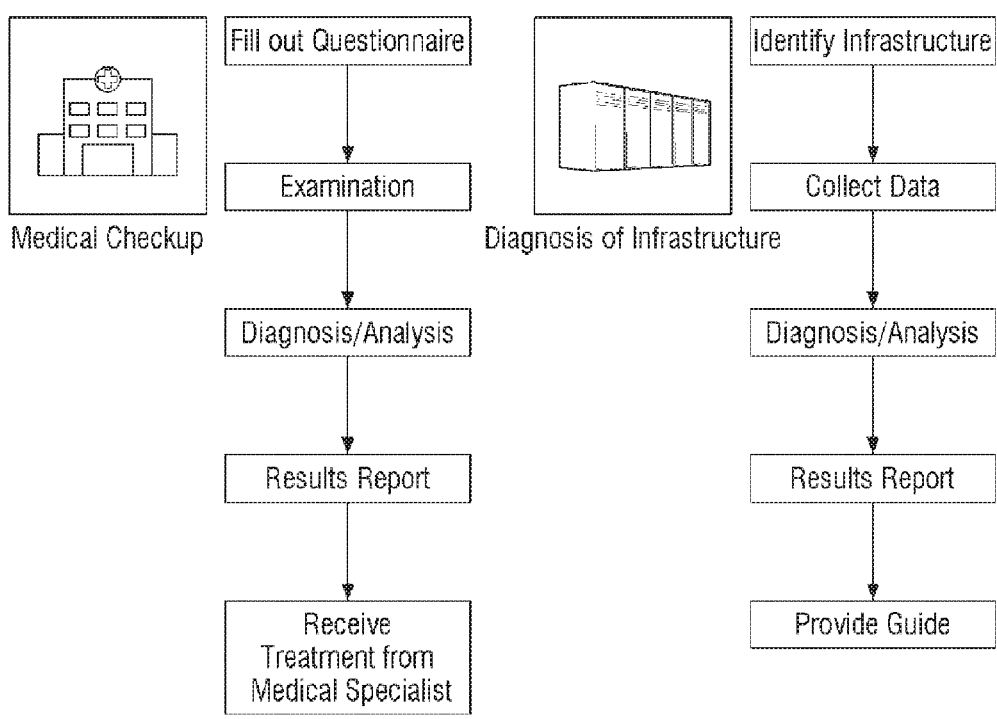
FIG. 1 is a schematic view illustrating an infrastructure diagnostic method according to an exemplary embodiment of the present disclosure.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is a schematic view illustrating an infrastructure diagnostic method according to an exemplary embodiment of the present disclosure.

Referring to FIG. 1, the diagnosis of information technology (IT) infrastructure may be considered as a medical checkup for IT infrastructure. To get a medical check-up, one needs to visit a hospital and fill out a questionnaire, and the medical check-up provides an overview of one's general health status.

After the questionnaire is filled out, specific examinations are performed. For example, information is collected by examining the brain, heart, stomach, large intestine, liver, thyroid, hearing, sight, blood, urine, etc. Thereafter, information collected by precision medical devices, clinical cases, and medical specialists is diagnosed and analyzed.

As results of the diagnosis and the analysis, a results report can be obtained. For example, one may identify a comprehensive health index or items that require further examination from the results report. If the results report shows that one has a problem with a specific site or organ, one may be retested and may receive treatment from a medical specialist. In this process, disease can be detected and treated in advance.

The diagnosis of IT infrastructure is similar. First, the status of IT infrastructure is identified. That is, the number of servers used in IT infrastructure to be diagnosed and the type of operating system (OS) installed in each of the servers are identified.

Thereafter, detailed information regarding each of the servers is collected. More specifically, information regarding the servers, storages, databases, middleware, networks, and security is collected.

Thereafter, vulnerability analysis is performed through a diagnosis/analysis process. For diagnosis/analysis, checklists for servers, storages, databases, middleware, networks, security, etc. need to be defined in advance. A determination is made as to whether each of the checklists is met by using an automated diagnostic tool, and a diagnosis/analysis results report is created. The checklists correspond to analysis rules.

By referring to the diagnosis/analysis results report, vulnerabilities of the IT infrastructure and the priorities among the vulnerabilities may be identified. That is, the diagnosis/analysis results report shows the grades of the vulnerabilities and may thus be used to determine which of the vulnerabilities needs to be addressed first. The diagnosis/analysis results report may also provide a guide for addressing each of the vulnerabilities of the IT infrastructure.

This guide can help small- to medium-size companies that lack the expertise to manage their IT infrastructure to easily address a considerable number of vulnerabilities of the IT infrastructure themselves. Accordingly, the IT infrastructure can be run stably and efficiently. Also, this guide can suggest short-, medium-, and long-term improvement tasks based on the priorities among the vulnerabilities of the IT infrastructure.

Figure 2:
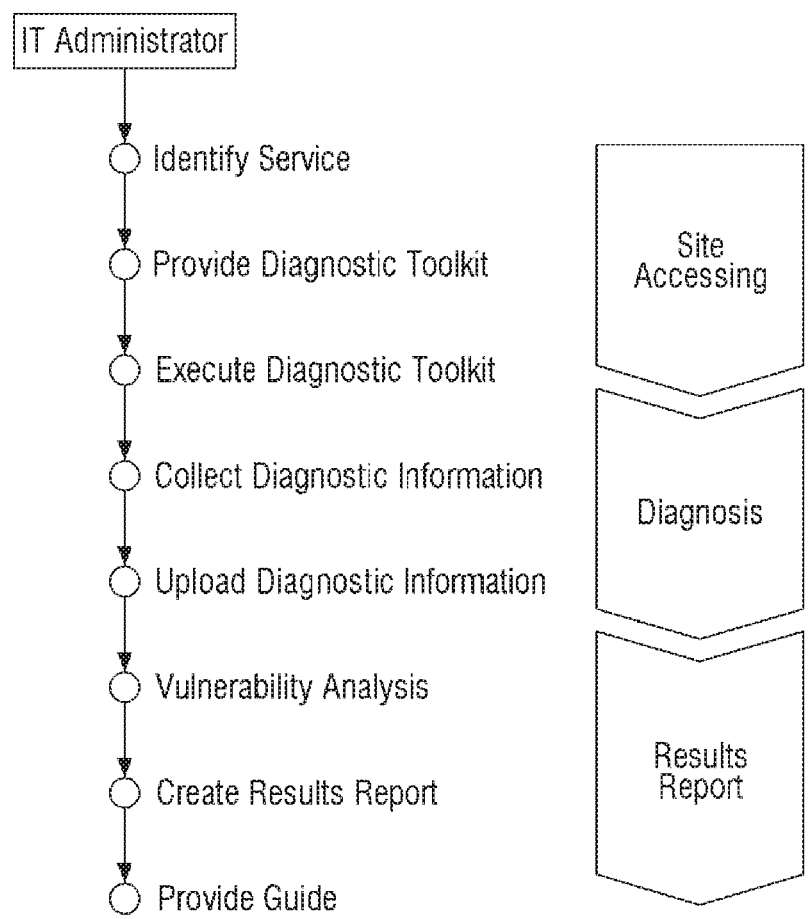
FIG. 2 is a schematic view illustrating a user scenario of an infrastructure diagnostic method according to an exemplary embodiment of the present disclosure.

FIG. 2 is a schematic view illustrating a user scenario of an infrastructure diagnostic method according to an exemplary embodiment of the present disclosure.

The main user base of the IT infrastructure diagnostic method according to the present exemplary embodiment may include IT managers or administrators of small- or medium-size companies and of various other companies. An IT infrastructure administrator may access a portal site established exclusively for a web-based IT infrastructure diagnosis. In this process, identification (ID) information is received from the IT infrastructure administrator.

The IT infrastructure administrator who logs onto the portal site enters system information of infrastructure that he or she manages. For example, the IT infrastructure administrator may enter Internet Protocol (IP) information of a server of the infrastructure that he or she manages. Then, an IT infrastructure diagnostic system automatically transmits an analysis script to the infrastructure of the IT infrastructure administrator. The analysis script includes a search script for searching for information regarding infrastructure and a collection script for collecting the information regarding infrastructure.

Infrastructure that needs to be diagnosed will hereinafter be referred to as a target system. The target system includes at least one operating server. The operating server of the target system will hereinafter be referred to as a target operating server. The analysis script may also be referred to as a diagnostic tool or a diagnostic toolkit.

In response to the IT infrastructure administrator (or a user) who logs onto the portal site entering IP information of the target system or IP information of the target operating server, the infrastructure diagnostic system transmits the analysis script to the target system or the target operating server.

The target system runs the search script included in the analysis script and transmits a collection script corresponding to the target operating server to the target operating server. Then, the target operating server receives the collection script transmitted by the target system, runs the received collection script to collect system information, and transmits the collected system information to the target system or an infrastructure analysis system.

Accordingly, simply by allowing the user to log on to the portal site and to enter the IP information of the target system, the analysis script may be automatically transmitted to the target system, and the system information of the target operating server may be automatically collected.

Alternatively, the system information of the target operating server may be collected not in an automated manner, but in a semi-automated manner for security reasons. More specifically, the user may download a diagnostic tool from the portal site. As mentioned earlier, the diagnostic tool is a script-type file. In other words, the diagnostic tool is a script-type file that can be run only once by the IT infrastructure administrator, rather than being an agent-type file that can be installed, and periodically run, in each server of the IT infrastructure.

In response to the IT infrastructure administrator executing the diagnostic tool in the target operating server, the diagnostic tool collects the system information of the target operating server. More specifically, the diagnostic tool collects hardware resources information, OS information, etc. of the target operating server and automatically uploads the collected information to the IT infrastructure diagnostic system. Information regarding each server of the IT infrastructure may be referred to as system information.

By using system information of the IT Infrastructure, the IT infrastructure diagnostic system analyzes vulnerabilities of the target operating server and creates a results report. The results report shows a vulnerability of the IT infrastructure for each checklist item. A guide for addressing vulnerabilities of the IT infrastructure may also be provided along with the results report. Accordingly, the IT infrastructure can be run stably and efficiently.

As illustrated in FIG. 2, the IT infrastructure diagnostic method according to the present exemplary embodiment is largely divided into three steps. The first step, i.e., a "site accessing" step, is the step of allowing the IT infrastructure administrator to log on to the web portal to have his or her infrastructure diagnosed and receiving the IP information of the target system from the IT infrastructure administrator. Alternatively, the "site accessing" step may be the step of allowing the IT infrastructure administrator to log on to the web portal, download the diagnostic tool, and run the diagnostic tool in the target system or the target operating server.

Thereafter, the second step (i.e., a "diagnosis" step), which is performed in the target operating server, is the step of collecting system information and uploading the collected system information to the infrastructure diagnostic system. The "diagnosis" step is automatically performed by the analysis script. The collection of system information by the analysis script is performed in the target operating server. The analysis script simply collects system information in order not to incur any additional burden on the target operating server. The actual diagnosis and analysis of system information may be performed in the third step.

The third step (i.e., a "results report" step) is the step of creating a results report based on system information and is performed in the IT infrastructure diagnostic system. The third step is the step of analyzing system information, creating a results report on any vulnerabilities found by the analysis, and providing a guide for addressing the found vulnerabilities.

In a conventional IT infrastructure diagnostic method, the steps of performing diagnosis and creating a results report are performed mostly offline by an IT infrastructure expert. Also, the conventional IT infrastructure diagnostic method mainly provides one-time diagnostics performed by each individual vendor, rather than comprehensive diagnostics.

On the other hand, the IT infrastructure diagnostic method according to the present exemplary embodiment can automatically perform the steps of performing diagnosis and creating a results report in a web-based manner. Also, the IT infrastructure diagnostic method according to the present exemplary embodiment can diagnose and analyze vulnerabilities of IT infrastructure comprehensively and can provide solutions for multiple vendors, rather than solutions for a single particular vendor.

Figure 3:
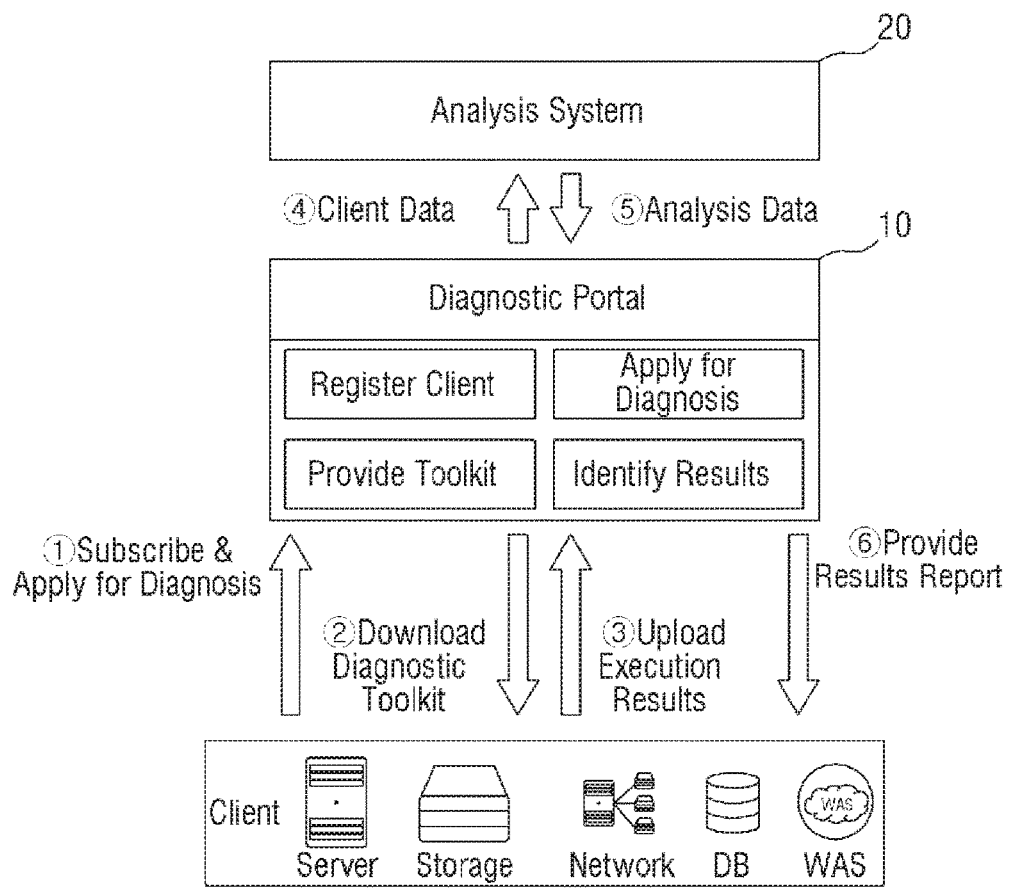
FIG. 3 is a signal flowchart illustrating an infrastructure diagnostic method according to an exemplary embodiment of the present disclosure.

FIG. 3 is a signal flowchart illustrating an infrastructure diagnostic method according to an exemplary embodiment of the present disclosure.

Referring to FIG. 3, a diagnostic portal 10 and an analysis system 20 are established to handle a request from a client, but the present disclosure is not limited thereto. That is, the diagnostic portal 10 and the analysis system 20 may perform the diagnosis of infrastructure inside a single server.

A client accesses the diagnostic portal 10 to have his or her IT infrastructure diagnosed. This process is similar to a process of using a typical website. The client subscribes for the diagnostic portal 10 and sends a request for diagnosis to the diagnostic portal 10. Examples of the IT infrastructure that the client wishes to have diagnosed includes a server, a storage, a network, a database (DB), and a web application server (WAS). The IT infrastructure corresponds to a target system, and each operating server of the IT infrastructure corresponds to a target operating server.

The type of information that needs to be collected from the target operating server by a diagnostic tool may vary. For example, OS information, user account information and user rights information may be collected from a server. On the other hand, DB engine information, server version information. DB compatibility information, and DB redundancy information may be collected from a DB.

Accordingly, the diagnostic tool may be provided in two steps. That is, an analysis script may include a search script and a collection script. The search script is a script transmitted first to the target system or to the target operating server or a script that the client downloads first from the diagnostic portal 10. A target to be diagnosed may be automatically identified by using a discovery script or the search script.

The collection script is a script for collecting information regarding the identified target. For example, different collection scripts may be automatically downloaded, depending on the type of the OS of the target operating server, to collect necessary information.

Similarly, in a case in which the identified target is a DB, different collection scripts may be automatically downloaded, depending on whether the DataBase Management System (DBMS) of the DB is Oracle, PostgreSQL, HANA, or SQL Server, to collect necessary information.

That is, in the exemplary embodiment of FIG. 3, the analysis script (i.e., the diagnostic tool or script) may include the search script, which is universally used by all types of IT infrastructure, and the collection script, which may vary depending on the type of the target operating server. The user may automatically transmit the search script by entering the IP information of the target system or of the target operating server, or may download only the search script and run the downloaded search script in the target operating server. In this manner, the collection script, which is a second-step script, may be downloaded and run automatically and selectively.

The collection script collects system information and automatically uploads the collected system information to the diagnostic portal 10. That is, once the client downloads the search script included in the diagnostic tool and runs the downloaded search script in each server of the IT infrastructure, or enters the IP information of the target operating server, subsequent processes for providing diagnostic results may be automatically performed.

The diagnostic portal 10 transmits the system information provided by the search script run in the IT infrastructure of the client to the analysis system 20. In order to create a results report, the analysis system 20 classifies the target system based on the system information according to predefined criteria.

Thereafter, the analysis system 20 selects analysis rules to be applicable to the diagnostic target system. That is, criteria for analyzing vulnerabilities may be set to vary depending on the type of the target system. The analysis system 20 may create a results report according to the criteria, i.e., the analysis rules, and may transmit the results report to the diagnostic portal 10. Then, the diagnostic portal 10 may provide the results report to the user.

Figure 4:
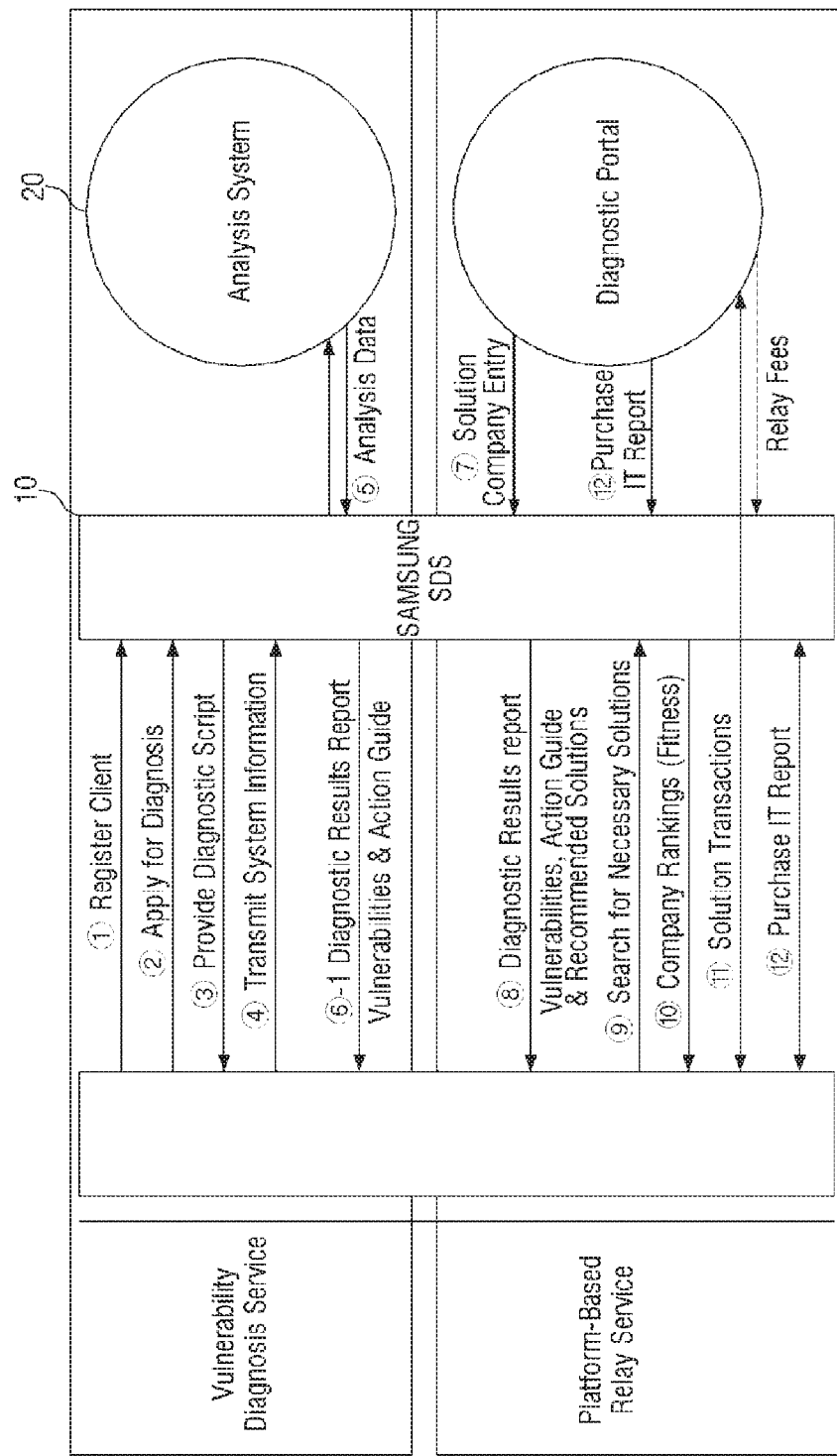
FIG. 4 is a schematic view illustrating how to use an infrastructure diagnostic method according to an exemplary embodiment of the present disclosure.

FIG. 4 is a schematic view illustrating how to use an infrastructure diagnostic method according to an exemplary embodiment of the present disclosure.

Referring to FIG. 4, the web-based IT infrastructure diagnostic method according to the present exemplary embodiment is not only for diagnosing vulnerabilities of IT infrastructure, but can also be extended as a platform-based service relay method. That is, the diagnostic portal 10, which is for use in the diagnosis of IT infrastructure, may serve as an "ecosystem". Accordingly, the transaction of IT infrastructure-related solutions can be activated.

For example, steps ①, ②, ③, ④, ⑤, and ⑥, i.e., "Register Client", "Apply for Diagnosis", "Provide Diagnostic Script", and "Diagnostic Results report" steps, may be the same as their respective counterparts of the web-based IT infrastructure diagnostic method according to the exemplary embodiment of FIG. 3. That is, steps ①, ②, ③, ④, ⑤, and ⑥ are for collecting system information and creating a results report according to analysis rules.

On the other hand, steps ⑦, ⑧, ⑨, ⑩, ⑪, and ⑫, i.e., "Solution Company Entry", "Diagnostic Results report", "Search for Necessary Solutions", "Company Rankings (Fitness)", and "Solution Transactions" steps, are for a new "ecosystem" using the diagnostic portal 10. In this manner, the transaction of IT infrastructure-related solutions can be activated by using the diagnostic portal 10.

Vulnerabilities found by vulnerability analysis may be addressed in various manners. For example, there may be simple ways to address the found vulnerabilities, such as changing a server's settings, changing each account's permissions, or installing updates having bugs related to the found vulnerabilities fixed.

In these simple methods, a guide and a guide script for addressing the found vulnerabilities may be provided along with a results report. Accordingly, simply by executing the guide script in each server in a similar manner to executing a vaccine for curing computer viruses, the found vulnerabilities may be addressed.

However, it may not always be simple to address the found vulnerabilities. For example, if a database is heavily loaded with frequent read operations, it may be necessary to provide a separate memory-based DB (or in-memory DB (IMDB)) for inquiries only.

If separate solutions are needed to address the found vulnerabilities, the diagnostic portal 10 may recommend one or more solutions for addressing the found vulnerabilities and may provide solution information, such as how the recommended solutions differ from one another, how the found vulnerabilities can be addressed by each of the recommended solutions, and how much improvement in performance can be achieved by each of the recommended solutions, to an IT infrastructure administrator.

The IT infrastructure administrator may decide whether to introduce a particular solution based on the solution information provided by the diagnostic portal 10. That is, in response to the user selecting a particular solution from among the recommended solutions, the selected solution may be automatically transmitted to, and installed in, a target operating server. Also, the configuration of the selected solution may be automatically performed. Also, billing may be performed if necessary.

From a client's point of view, the client can gather and compare information only regarding solutions related to his or her infrastructure's vulnerabilities and can thus easily choose from a variety of solutions. From a solution vendor's point of view, the solution vendor can be allowed to selectively contact customers who are in need of solutions that the solution vendor provides, and thus, marketing can be simplified and facilitated. Also, the diagnostic portal 10, which provides infrastructure diagnostics for free, can be benefited from relay fees between the client and the solution vendor, so an "ecosystem" where everybody wins can be built.

Figure 5:
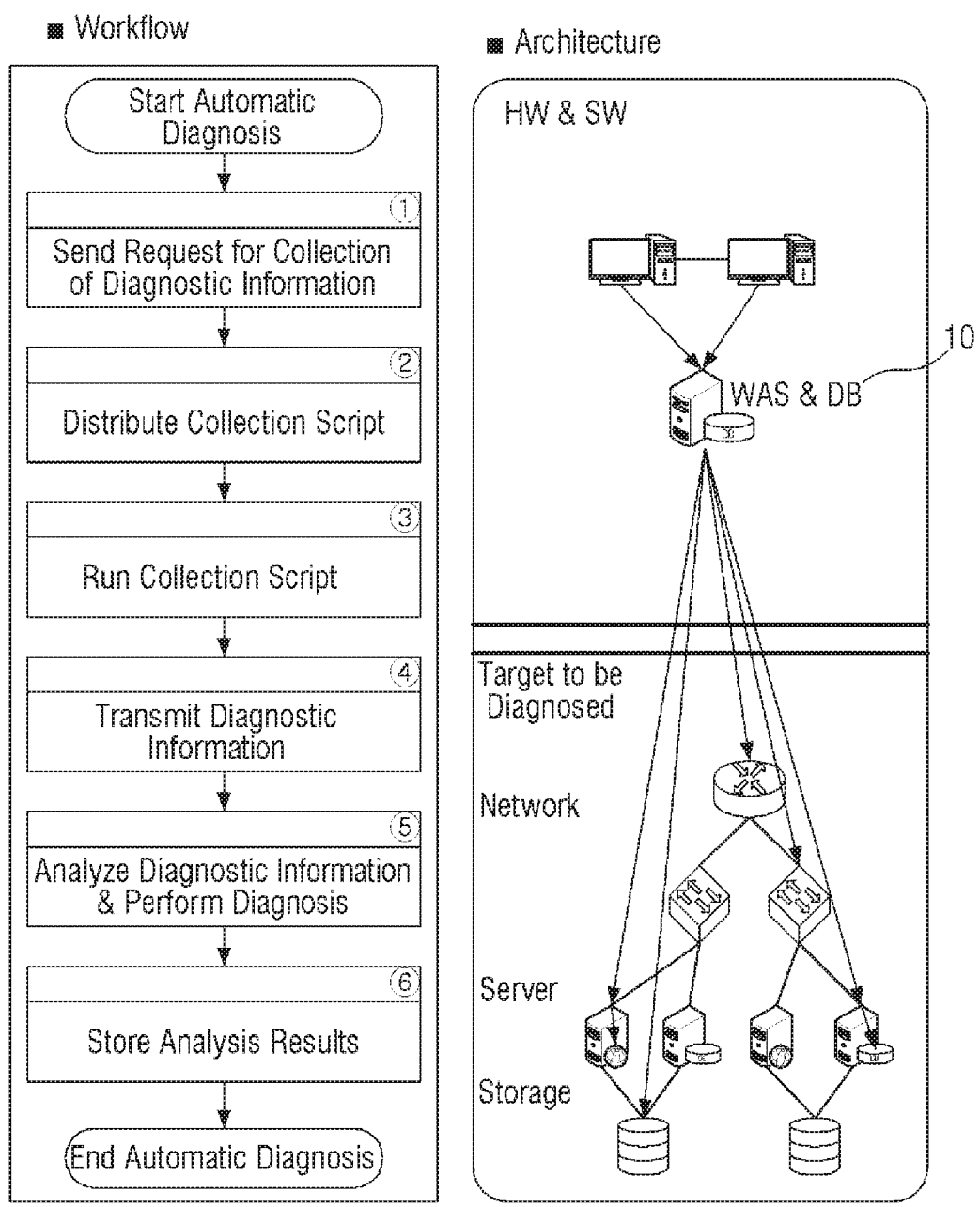
FIG. 5 is a schematic view illustrating an infrastructure diagnostic system according to an exemplary embodiment of the present disclosure.

FIG. 5 is a schematic view illustrating an infrastructure diagnostic system according to an exemplary embodiment of the present disclosure.

Referring to FIG. 5, an IT infrastructure administrator accesses and logs on to the diagnostic portal 10 and sends a request for the collection of system information. The diagnostic tool may be downloaded from the diagnostic portal 10. Information such as the ID of a user who accesses the diagnostic portal 10 is stored in the diagnostic portal 10, and system information collected by the diagnostic tool may be automatically uploaded to the diagnostic portal 10 to correspond with the ID of the user.

Alternatively, the IT infrastructure administrator who logs onto the diagnostic portal 10, i.e., the user, may enter the IP information of his or her IT infrastructure. Then, an analysis script may be automatically transmitted to a target system and a target operating server, and system information of the target operating server may be automatically collected. The collected system information may be automatically uploaded to the diagnostic portal 10 to correspond with the ID of the user.

The diagnostic portal 10 receives the collected system information, analyzes and classifies the collected system information by the OS name, DB name, host name, etc., of each server of the IT infrastructure and registers the classified system information as information of the IT infrastructure. Thereafter, the diagnostic portal 10 performs vulnerability analysis on the IT infrastructure based on the collected system information. Vulnerability analysis may be performed using checklists (i.e., analysis rules), and the following five checklist categories may be provided: 1) configuration; 2) defects and errors; 3) availability; 4) performance and capacity; and 5) operation. A results report is created later based on these five checklist categories.

Approximately 1,800 checklists are divided into the above five checklist categories. If a checklist is satisfied, the checklist is marked as "true", and otherwise, the checklist is marked as "false". A results report may be provided by visualizing vulnerabilities based on the number of cases that meet checklists belonging to a particular category and the number of cases that do not meet the checklists.

An analysis engine, i.e., rule information for diagnosis, is managed in an eXtensible Markup Language (XML) format and is classified according to the type of target system. Once diagnosis begins, configuration information and vulnerabilities are analyzed using an uploaded file and using the rule information. The results of the analysis may be stored in a DB used by the diagnostic portal 10 in association with the ID used by the IT infrastructure administrator to log on to the diagnostic portal 10 and the date and time of the diagnosis.

Table 1 below shows exemplary rule information managed by the analysis engine. More specifically, Table 1 shows exemplary checklists for a case in which a target to be diagnosed is an OS, particularly, Windows. In a case in which the target to be diagnosed is Windows, Microsoft's OS, vulnerability analysis may be performed by managing five categories of checklists, shown in Table 1 below, based on rules in the XML format.

TABLE 1

| Configuration | Boot configuration, swap/paging configuration, dump configuration, OS configuration, network configuration, disk configuration |
|---|---|
| Defects & Errors | System log, patch, hardware |
| Availability | Redundant configuration, cluster S/W configuration, shared the system configuration, hardware |
| Performance & Capacity | CPU, memory, network, disk |
| Operation | Monitoring, EOS, patch management, regular PM, backup |

Table 2 below shows another exemplary rule information managed by the analysis engine. More specifically, Table 2 shows exemplary checklists for a case in which the target to be diagnosed is HP-UX, Hewlett Packard (HP)'s OS. In a case in which the target to be diagnosed is HP-UX, HP's OS, vulnerability analysis may be performed by managing five categories of checklists, shown in Table 2 below, based on rules in the XML format.

TABLE 2

| Configuration | Boot configuration, swap/paging configuration, dump configuration, OS configuration, network configuration, disk configuration |
|---|---|
| Defects & Errors | Patch, network, hardware |
| Availability | Redundant configuration, shared file system configuration |

TABLE 2-continued

| Performance & Capacity | CPU, memory, network, disk |
|---|---|
| Operation | Monitoring, EOS, regular PM |

Table 3 below shows another exemplary rule information managed by the analysis engine. More specifically, Table 3 shows exemplary checklists for a case in which the target to be diagnosed is AIX, IBM's OS. In a case in which the target to be diagnosed is AIX, IBM's OS, vulnerability analysis may be performed by managing five categories of checklists, shown in Table 3 below, based on rules in the XML format.

TABLE 3

| Configuration | Boot configuration, swap/paging configuration, dump configuration, OS configuration, network configuration, disk configuration |
|---|---|
| Defects & Errors | System log, patch, network, compatibility, hardware, redundancy configuration |
| Availability | Redundant configuration, cluster S/W configuration, shared file system configuration, hardware |
| Performance & Capacity | CPU, memory, network, disk |
| Operation | Monitoring, EOS, backup |

Table 4 below shows another exemplary rule information managed by the analysis engine. More specifically, Table 4 shows exemplary checklists for a case in which the target to be diagnosed is Solaris, Sun Microsystems' OS. In a case in which the target to be diagnosed is Solaris, Sun Microsystems' OS, vulnerability analysis may be performed by managing five categories of checklists, shown in Table 4 below, based on rules in the XML format.

TABLE 4

| Configuration | Boot configuration, swap/paging configuration, dump configuration, OS configuration, network configuration, disk configuration |
|---|---|
| Defects & Errors | System log, patch, hardware, network |
| Availability | Cluster S/W configuration, shared file system configuration |
| Performance & Capacity | CPU, memory, network |
| Operation | Monitoring, system log, EOS, backup |

Table 5 below shows another exemplary rule information managed by the analysis engine. More specifically, Table 5 shows exemplary checklists for a case in which the target to be diagnosed is an OS, particularly, Linux. In a case in which the target to be diagnosed is Linux, vulnerability analysis may be performed by managing five categories of checklists, shown in Table 5 below, based on rules in the XML format.

TABLE 5

| Configuration | Boot configuration, swap/paging configuration, dump configuration, OS configuration, network configuration, disk configuration |
|---|---|
| Defects & Errors | System log, network |
| Availability | Redundant configuration, cluster S/W configuration, capacity, hardware |
| Performance & Capacity | CPU, memory, network, disk |
| Operation | Monitoring, system log, patch management, regular PM, EOS, backup |

Table 6 below shows another exemplary rule information managed by the analysis engine. More specifically, Table 6 shows exemplary checklists for a case in which the target to be diagnosed is an OS, particularly, VMware. In a case in which the target to be diagnosed is VMware, vulnerability analysis may be performed by managing five categories of checklists, shown in Table 6 below, based on rules in the XML format.

TABLE 6

| Configuration | Dump configuration, OS configuration, network configuration, BIOS configuration, security configuration |
|---|---|
| Defects & Errors | Network, storage |
| Availability | Redundant configuration, cluster S/W configuration, capacity, hardware, network configuration |
| Performance & Capacity | CPU, memory, network, disk, server configuration |
| Operation | System log, patch management, user management, image management |

Tables 1 through 6 show the checklists for typical types of OSs, which, however, are merely exemplary and are simply for the convenience of understanding. That is, there may be checklists for other types of OSs than those set forth in Tables 1 through 6. Also, there may be provided additional checklists for the types of OSs set forth in Tables 1 through 6.

The web-based IT infrastructure diagnostic method according to the present exemplary embodiment is characterized in that various OSs can be diagnosed based on rules in the XML format, and checklists are classified and managed in five categories. Obviously, the number of checklist categories provided may be less than, or more than, five.

However, when five checklist categories are used, user convenience may be improved in connection with the visualization and provision of checklist-based diagnostic results, and this will be described later in detail with reference to FIGS. 7 through 14. Checklists may be managed based on XML-format rules not only for OSs, like those set forth in Tables 1 through 6, but also for DBs.

Table 7 below shows another exemplary rule information managed by the analysis engine. More specifically, Table 7 shows exemplary checklists for a case in which the target to be diagnosed is a DB, particularly, Oracle. In a case in which the target to be diagnosed is Oracle, vulnerability analysis may be performed by managing five categories of checklists, shown in Table 7 below, based on rules in the XML format.

TABLE 7

| Configuration | CRS environment configuration, DB configuration (parameter, user, space, etc.), OS environment configuration, storage configuration, stabilization DB parameter |
|---|---|
| Defects & Errors | CRS S/W bug, DB environment configuration, OS S/W bug, OS environment configuration, error occurrence |
| Availability | CRS environment configuration, DB redundancy configuration, DB environment configuration, server redundancy configuration |
| Performance & Capacity | Application DB object, DB Environment configuration, IO configuration, OS environment configuration, resource utilization |
| Operation | DB management, S/W version management, monitoring, performance/capacity, backup recovery management, general management (operation, PM, LOG) |

Table 8 below shows another exemplary rule information managed by the analysis engine. More specifically, Table 8 shows exemplary checklists for a case in which the target to be diagnosed is a DB, particularly, MS-SQL. In a case in which the target to be diagnosed is MS-SQL, vulnerability analysis may be performed by managing five categories of checklists, shown in Table 8 below, based on rules in the XML format.

TABLE 8

| Configuration | DB engine, DB operation, DB environment configuration |
|---|---|
| Defects & Errors | SQL Server version checking, database compatibility, error checking |
| Availability | Redundancy, clusters, backup/recovery |
| Performance & Capacity | DB performance, monitoring |
| Operation | DB management, security policy, index management |

Table 9 below shows another exemplary rule information managed by the analysis engine. More specifically, Table 9 shows exemplary checklists for a case in which the target to be diagnosed is a DB, particularly, HANA. In a case in which the target to be diagnosed is HANA, vulnerability analysis may be performed by managing five categories of checklists, shown in Table 9 below, based on rules in the XML format.

TABLE 9

| Configuration | OS environment configuration, DB configuration (parameter, user, space, etc.) |
|---|---|
| Defects & Errors | Error occurrence, DB S/W bug, OS S/W bug |
| Availability | DB environment configuration, server redundancy configuration |
| Performance & Capacity | DB environment configuration, resource utilization |
| Operation | DB management, S/W version management, monitoring, backup recovery management, performance/capacity, general management (operation, PM, log) |

Table 10 below shows another exemplary rule information managed by the analysis engine. More specifically, Table 10 shows exemplary checklists for a case in which the target to be diagnosed is a DB, particularly, PostgreSQL. In a case in which the target to be diagnosed is PostgreSQL, vulnerability analysis may be performed by managing five categories of checklists, shown in Table 10 below, based on rules in the XML format.

TABLE 10

| Configuration | DB configuration (parameter, user, space, etc.), OS environment configuration |
|---|---|
| Defects & Errors | DB environment configuration, error occurrence |
| Availability | DB redundancy, server redundancy configuration |
| Performance & Capacity | DB environment configuration, resource utilization |
| Operation | DB management, S/W version management, monitoring, backup recovery management, performance/capacity, general management (operation, PM, log) |

As shown in Tables 7 through 10, checklists for one DB type for the diagnosis of IT infrastructure may differ from checklists for another DB type for the diagnosis of IT infrastructure. Thus, the user may log on to the diagnostic portal 10 and may download and run the search script, which is included in the diagnostic tool, in each server of his or her IT infrastructure.

Alternatively, the user may log on to the diagnostic portal 10 and may enter the IP information of the target system or the target operating server. Then, the search script may be automatically transmitted to, and run in, the target system or the target operating server. The transmission and execution of the search script may be performed automatically or manually.

The collection script, such as an OS, a DB, etc. needed in the search script, is automatically downloaded and run from the diagnostic portal 10, and as a result, system information is collected. The collection script collects system information that can be identified with the use of the checklists shown in each of Tables 1 through 10, from each server of the IT infrastructure, and uploads the collected system information to the diagnostic portal 10.

The IT infrastructure diagnostic method according to the present exemplary embodiment is applicable to the diagnosis of various products, as shown in Tables 1 through 10. Also, the IT infrastructure diagnostic method according to the present exemplary embodiment can provide comprehensive diagnostics, compared to conventional diagnostic methods provided by existing IT infrastructure suppliers. The types and versions of products to which the IT infrastructure diagnostic method according to the present exemplary embodiment is applicable are as shown in Table 11 below.

TABLE 11

| | | | |
|---|---|---|---|
| OS | Windows | — | Windows Server 2000 or higher (x86_32, x86_64) |
| | Unix | HP-UX | 11.00 or higher (PA-RISC2.0, IA64) |
| | | Solaris | Solaris 10 (x86, SPARC) |
| | | AIX | 5.3 or higher (Power) |
| | Linux | Red Hat | Enterprise Linux 4 or higher (i386, x86_64, ia64) |
| | | CentOS | CentOS 4 or higher (i386, x86_64, ia64) |
| | | Ubuntu | Ubuntu 10.04.x~14.04.x (i386, x86_64, a64) |
| | | SUSE | Enterprise Server 10~11 (i386, x86_64, ia64, Power, System z) |
| | | Oracle Linux | 4.5 or higher (i386, x86_64, ia64) |
| DBMS | SQL Server | Windows | 2005 or higher (x86_32, x86_64) |
| | Oracle | Unix/Linux | 9.0, 9.2, 10.1, 10.2, 11.1 (All Unix/Linux versions except for Windows) |
| | SAP HANA | Red Hat, SUSE (all) | SAP HANA Platform SPS 08~11 (x86_64) |
| | PostgreSQL | Linux (all) | 9.5 (x86_64) |
| Virtualization | VMware | — | ESXi 5.5, 6.0 |

Referring to Table 11, the IT infrastructure diagnostic method according to the present exemplary embodiment can comprehensively diagnose various products from various vendors and can thus allow IT infrastructure administrators to manage their IT infrastructure effectively and stably. However, Table 11 is merely exemplary and is simply for the convenience of understanding, and further diagnosis is possible even if the versions of the products listed in Table 11 are updated The web-based IT infrastructure diagnostic method according to the present exemplary embodiment can help small- and medium-size companies of various industries manage their IT infrastructure. For example, in the manufacturing industry, there may be provided IT infrastructure for ordering, inventory management, and production automation systems. In the information and communication industry, there may be provided IT infrastructure for IT equipment and communication systems. In the financial/insurance industry, safety diagnosis and security diagnosis are essential. In the construction industry, there may be provided IT infrastructure for process/material/drawing management.

The IT infrastructure of small and medium-size companies of various industries consists of various servers and uses various products. Therefore, there is a clear limit to one-time diagnostics provided by existing IT infrastructure suppliers, and thus, continuous and integrated diagnostics like that provided by the diagnostic method according to the present exemplary embodiment is needed. The diagnostic method according to the present exemplary embodiment can manage IT infrastructure stably and efficiently with the functions of registering targets to be diagnosed and managing a history of diagnosis.

In addition, the types of operating servers that constitute a small- or medium-size company's IT infrastructure may vary depending on the nature of the company, and criteria for checking vulnerabilities may also vary. For example, checklists used by a telecommunication company for the diagnosis of IT infrastructure may differ from checklists used by a financial/insurance company for the diagnosis of IT infrastructure because stricter rules are applied for security in the financial/insurance industry than in the telecommunication industry.

Therefore, the diagnosis portal 10 may further receive information on each company using IT infrastructure from the user, and can diagnose vulnerabilities by using different analysis rules for different companies. Alternatively, the diagnostic portal 10 may identify the type of business of each company using IT infrastructure based on information on each server of the corresponding IT infrastructure and may automatically load analysis rules based on the results of the identification.

Table 12 below shows multiple categories of vulnerabilities that can be found by IT infrastructure diagnostics. Referring to Table 12, a total of 313 items are inspected, and an action guide is provided accordingly.

TABLE 12

| Classification | Sub-classification | Number of Items Diagnosed |
|---|---|---|
| UNIX | Account Management | 15 |
| | File/Directory Management | 19 |
| | Service Management | 36 |
| | Patch Management | 1 |
| Window | Account Management | 18 |
| | Service Management | 35 |
| | Patch Management | 3 |
| | Log Management | 5 |
| | Security Management | 20 |
| | DB Management | 1 |
| Security Equipment | Account Management | 5 |
| | Access Management | 3 |
| | Patch Management | 2 |

TABLE 12-continued

| Classification | Sub-classification | Number of Items Diagnosed |
|---|---|---|
| | Log Management | 6 |
| | Function Management | 10 |
| Network Equipment | Account Management | 4 |
| | Access Management | 5 |
| | Patch Management | 1 |
| | Function Management | 22 |
| | Log Management | 6 |
| Control System | Account Management | 3 |
| | Patch Management | 1 |
| | Access Control | 5 |
| | Security Management | 13 |
| PC | Account Management | 3 |
| | Service Management | 6 |
| | Patch Management | 3 |
| | Security Management | 8 |
| DBMS | Account Management | 6 |
| | Access Management | 8 |
| | Option Management | 6 |
| | Patch Management | 3 |
| | Log Management | 1 |
| Web | Web Vulnerability Management | 28 |

Figure 6:
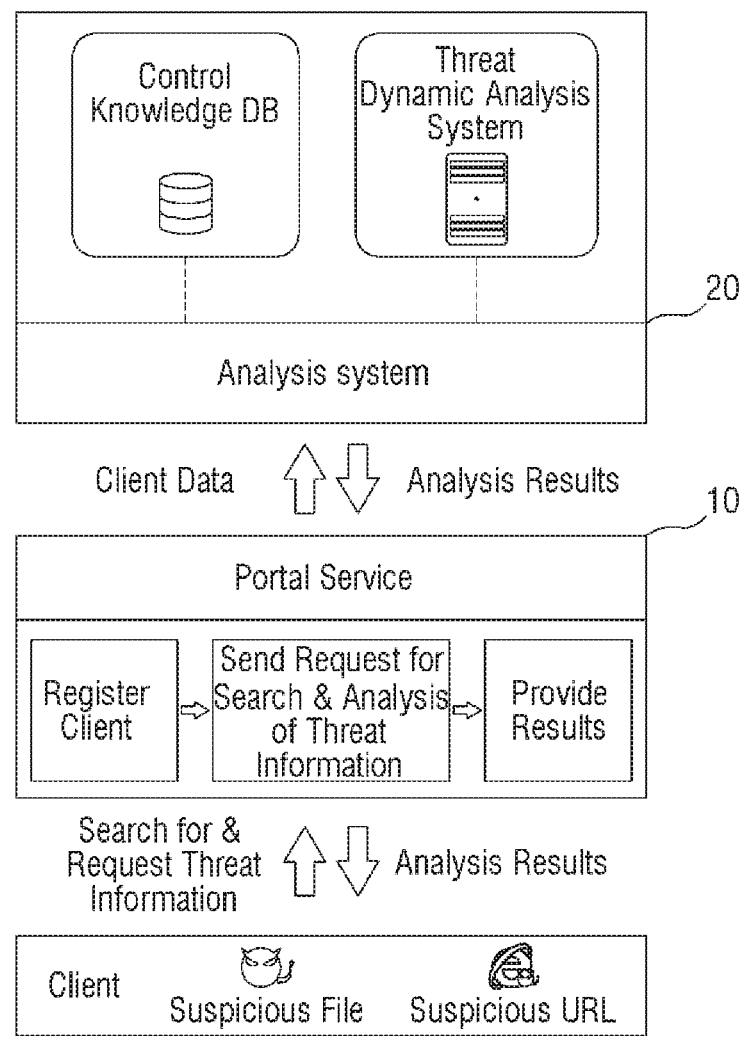
FIG. 6 is a schematic view illustrating a threat information analysis method according to an exemplary embodiment of the present disclosure.

FIG. 6 is a schematic view illustrating a threat information analysis method according to an exemplary embodiment of the present disclosure.

Referring to FIG. 6, the diagnostic portal 10 not only provides an IT infrastructure diagnostic function, but also provides additional information such as system information of suspicious files, Universal Resource Locators (URLs), and IPs. Accordingly, a client who logs on to the diagnostic portal 10 may upload or enter a suspicious file, URL, or IP and may receive the results of the uploading or entering.

Alternatively, a diagnostic tool may also be used. For example, a collection script may analyze the log of servers, may collect IPs or URLs that frequently access the servers, and may transmit the collected IPs or URLs to the diagnostic portal 10. Alternatively, the collection script may collect information regarding files uploaded by general users and may transmit the collected information to the diagnostic portal 10.

Then, when a results report is provided based on system information of IT infrastructure, security information regarding malicious URLs or IPs and analysis information regarding malicious files can also be provided. In addition, if a threatening URL or IP is found, an action guide capable of blocking the found URL or IP can also be provided.

FIGS. 7 through 14 are schematic views illustrating a results report according to an exemplary embodiment of the present disclosure.

An exemplary results report is as illustrated in FIGS. 7 through 14. More specifically, FIG. 7 shows an example of a screen displaying a diagnostic result overview. The number of devices that have been diagnosed and the results of the diagnosis, which are converted into diagnostic scores, are intuitively provided to a user. A list of any possible threats or risks may also be provided to the user.

Referring to FIG. 7, a total of 17 servers are diagnosed, and the results of the diagnosis show that IT infrastructure including the 17 servers is vulnerable with a diagnostic score of 50 points. The results of the diagnosis also show that a stabilization improvement process focusing on vulnerabilities in the OS and DBMS aspects, in particular, of the IT infrastructure is needed.

Referring to the top menu bars of FIG. 7, a diagnostic overview, comprehensive diagnostic results, sector-specific diagnostic results, and an action guide may be provided. The comprehensive diagnostic results will be described later with reference to FIG. 9. The sector-specific diagnostic results will be described later with reference to FIGS. 10 to 12. The action guide will be described later with reference to FIGS. 13 and 14.

FIG. 8 shows a GUI screen providing additional descriptions of the details of the diagnostic overview of FIG. 7. Referring to FIG. 8, targets to be diagnosed may be classified and provided according to their diagnostic field, and the number of servers corresponding to each of the targets may be provided.

More specifically, as shown in FIG. 8, there are three diagnostic fields, i.e., an "OS" field, a "DBMS" field, and a "Virtualization" field. For the "OS" field, five Windows servers including WINDOWS R2_2012, WINDOWS 2007, and WINDOWS 8, and three Linux servers (i.e., LINUX_SERVER_1, LINUX_SERVER_2, and LINUX_SERVER_3) are diagnosed.

For the "DB" field, one Oracle server, i.e., LINUX_SERVER_3, three SQL servers (i.e., SQL_SERVER_K-T_IDC, SQL_SERVER_SDS_ID, and SQL_SERVER_SD-SA_IDC), and four PostgreSQL servers are diagnosed.

For the "Virtualization" field, one VMware server is diagnosed. In short, a total of 17 servers are diagnosed. The "Diagnosed Equipment" column of FIG. 8 shows system information collected by a collection script and classified by OS, DB, and host names.

Figure 9:
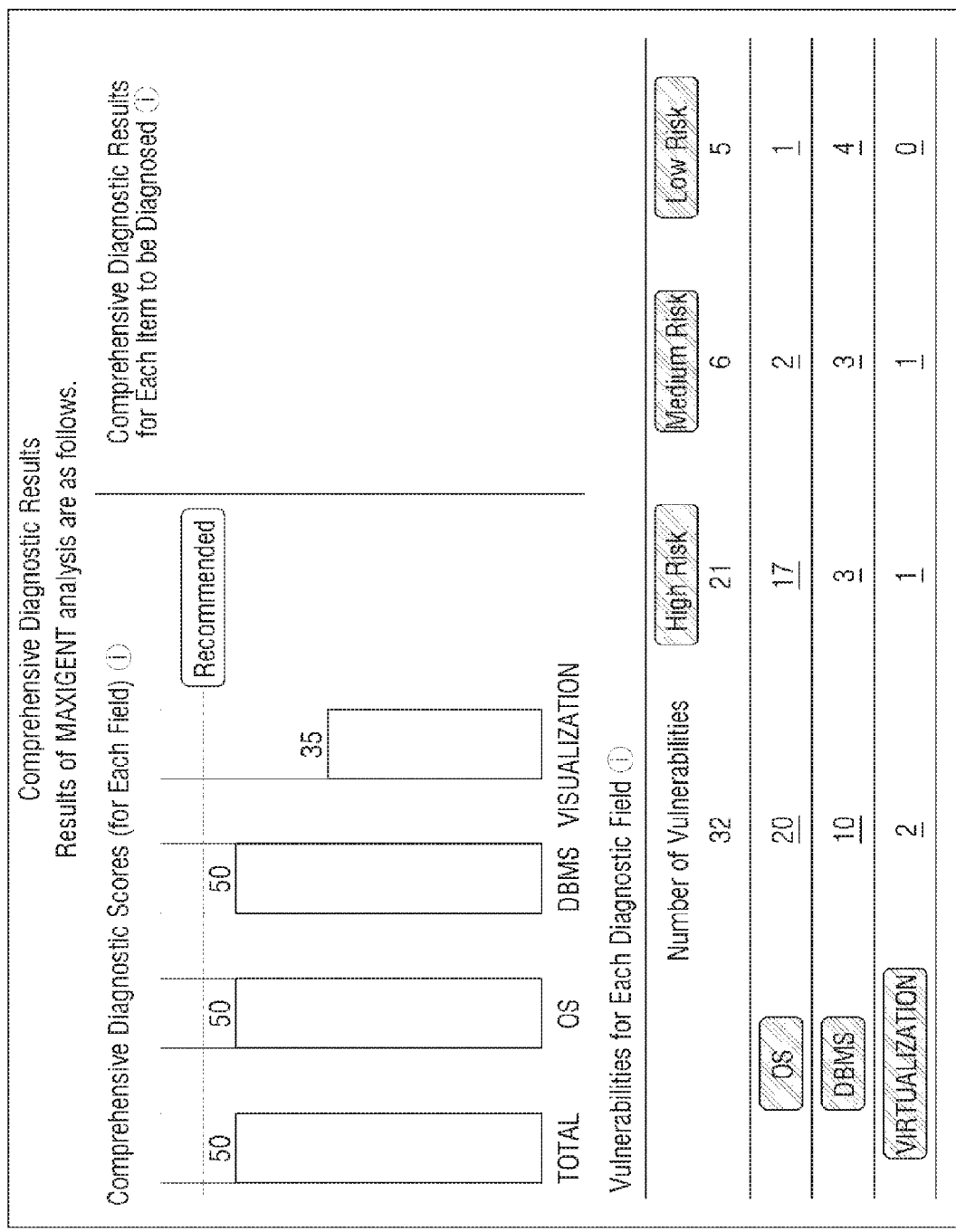

FIG. 9 shows the details of the information described above in FIGS. 7 and 8. Referring to FIG. 9, the "Comprehensive Diagnostic Scores (for Each Field)" section shows a visualization of a diagnostic score for each diagnostic field, indicating whether checklists are met, and the "Vulnerabilities for Each Diagnostic Field" section shows a visualization of the distribution of found vulnerabilities belonging to each diagnostic field.

Referring to FIG. 9, the diagnostic scores for the "OS" and "DBMS" fields are both 50 points, which correspond to a recommended score, but the diagnostic score for the "Visualization" field is only 35 points, which means that multiple vulnerabilities have been found. More specifically, in the case of the "OS" field, a total of 20 vulnerabilities including 17 high-risk vulnerabilities, 2 medium-risk vulnerabilities, and one low-risk vulnerability have been found.

In the case of the "DBMS" field, a total of 10 vulnerabilities including 3 high-risk vulnerabilities, 3 medium-risk vulnerabilities, and 4 low-risk vulnerabilities have been found. In the case of the "Visualization" field, a total of 2 vulnerabilities including one high-risk vulnerability, one medium-risk vulnerability, and zero low-risk vulnerability have been found.

As described above, checklists, which are managed based on rules in the XML format, are classified according to their risk levels. Then, a comprehensive diagnostic score is calculated based on the number of items that do not meet checklists and the risk levels of the items that do not meet the checklists. Accordingly, information indicating which vulnerabilities in which diagnostic field are more serious can be intuitively provided to a user.

Figure 10:
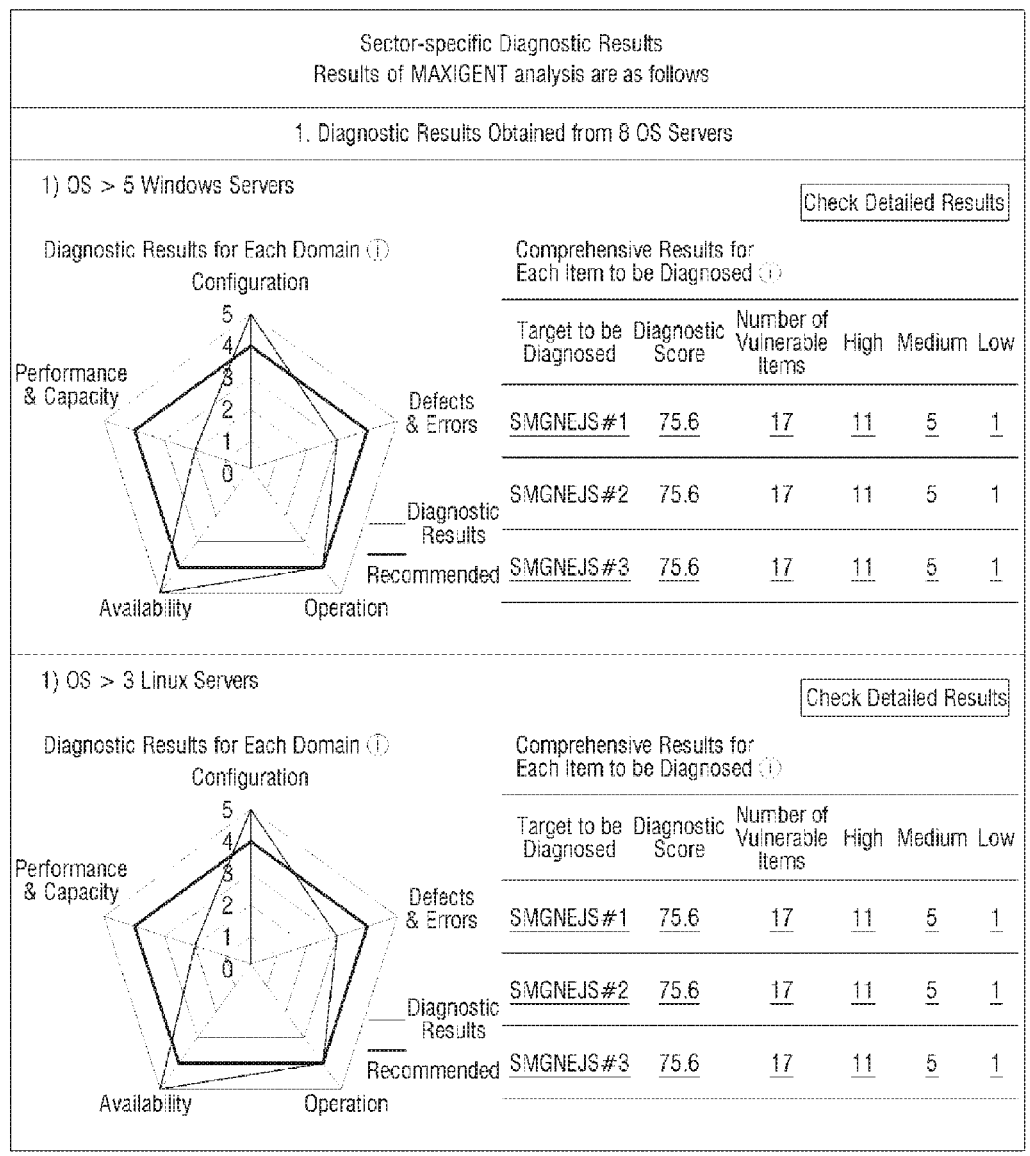
Figure 11:
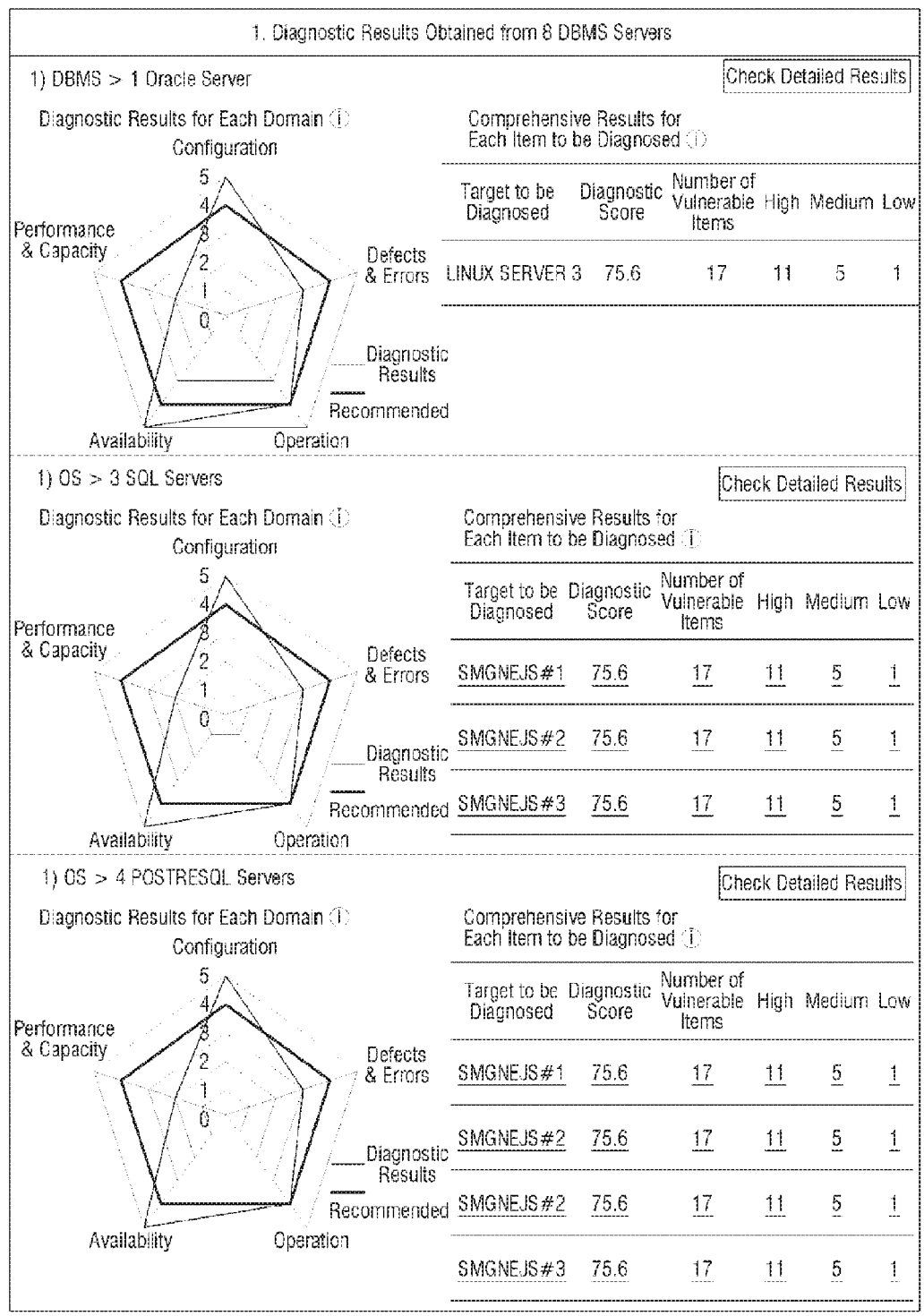
Figure 12:
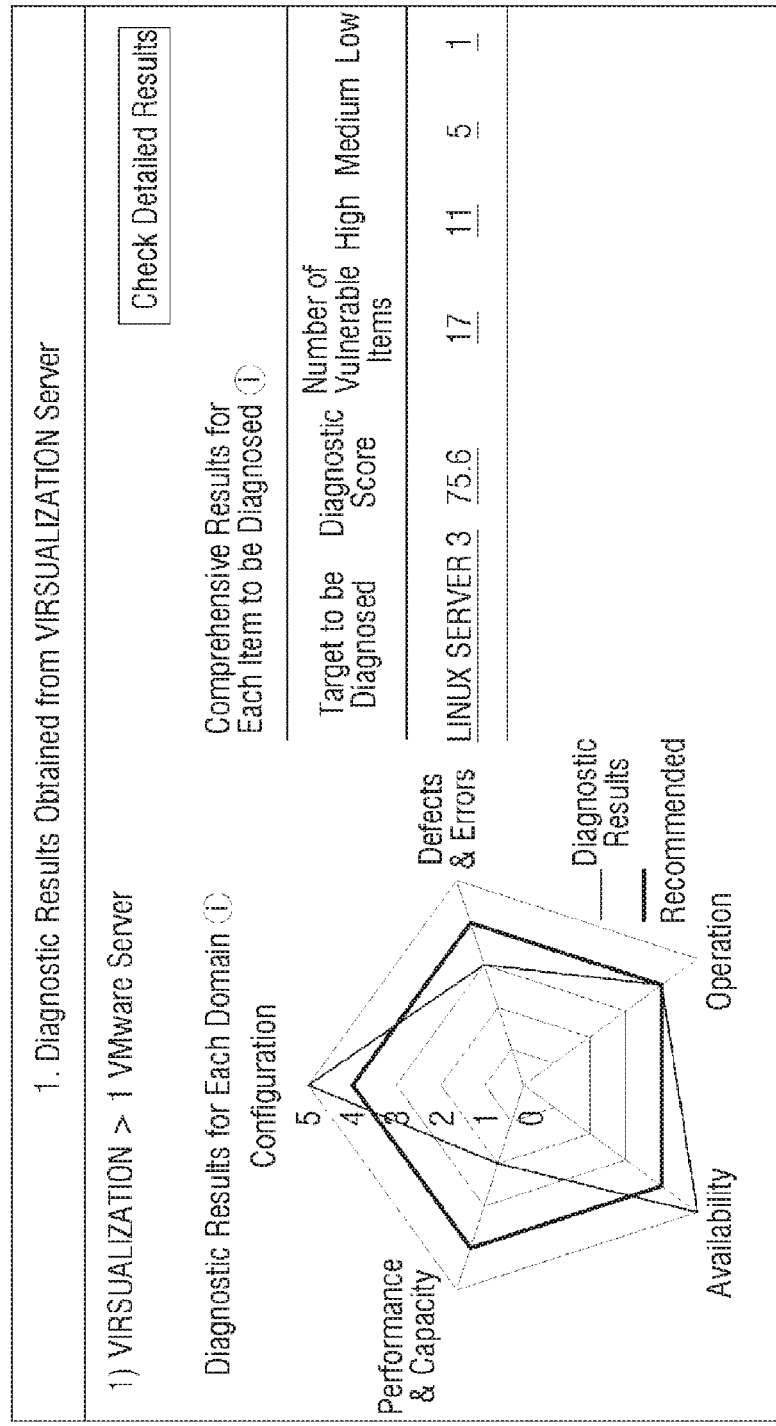

Detailed diagnostic results for each diagnostic field can be provided, as illustrated in FIGS. 10 through 12. FIG. 10 shows diagnostic results obtained from five Windows servers and three Linux servers. Referring to FIG. 10, checklists are divided into three categories, i.e., a high-risk category, a medium-risk category, and a low-risk category, according to their risk levels, and are also divided into five categories, a "Configuration" category, a "Defects & Errors" category, an "Availability" category, a "Performance & Capacity" category, and an "Operation" category, according to their characteristics.

Diagnostic results obtained using the checklists may be visualized and presented in the form of a pentagonal score chart, as illustrated in FIG. 10. It is clear, from the diagnostic results of FIG. 10, that the five Windows servers have vulnerabilities in their "Performance & Capacity" aspects. Similarly, the vulnerabilities of the three Linux servers may be analyzed using the checklists, and a visualization of the results of the analysis may be provided to a user.

FIG. 11 shows diagnostic results obtained from one Oracle server, three SQL servers, and 4 PostgreSQL servers. FIG. 12 shows diagnostic results obtained from one VMware server. As discussed above, by using the IT infrastructure diagnostic method according to the present exemplary embodiment, comprehensive system information of multiple servers can be provided to a user.

A guide for addressing found vulnerabilities belonging to each diagnostic field may be provided, as illustrated in FIG. 13. Referring to FIG. 13, short-, medium-, and long-term tasks, which are distinguished from one another by their levels of difficulty and importance, are provided separately to a user as a guide for addressing found vulnerabilities.

The short-term task is a task that can be performed immediately without additional investment, such as changing settings or installing updates. The medium-term task is a task that does not incur any cost but requires the turning on or off of equipment. The long-term task is a task that requires investment, such as replacing equipment.

The short- and medium-term tasks may provide a guide script file capable of automatically taking measures according to the guide. That is, user convenience may be improved by providing a guide script so as to automatically change settings or automatically install updates.

In a case in which no particular investment is needed, the short- and medium-term tasks may transmit a guide script to a target system or a target operating server and may automatically run the guide script in the target system or the target operating server. Then, necessary settings may be automatically changed, or necessary updates may be automatically installed. Also, the target operating server may be restarted, if necessary.

Also, if necessary, solutions for addressing vulnerabilities may be provided to a user. Then, in response to the user choosing a particular solution, the chosen solution may be transmitted to the target operating server, and the installation and the setting of the chosen solution in the target operating server may be automatically performed. In this process, billing may be performed if necessary.

Analysis information and the action guide may be stored in association with to the ID of the user. In this manner, a history of the diagnosis and analysis of IT infrastructure may be managed.

FIG. 14 illustrates an exemplary guide for analyzing a DB and addressing the vulnerabilities of the DB. Referring to FIG. 14, diagnostic results obtained using checklists related to the DB performance of IT infrastructure are provided as a total diagnostic score, and vulnerabilities of the IT infrastructure are identified. SQL performance, among other aspects of the IT infrastructure, is determined to be particularly vulnerable and thus to be in need of the tuning of SQL with a long running time. In this manner, the DB performance of the IT infrastructure may be improved.

Figure 15:
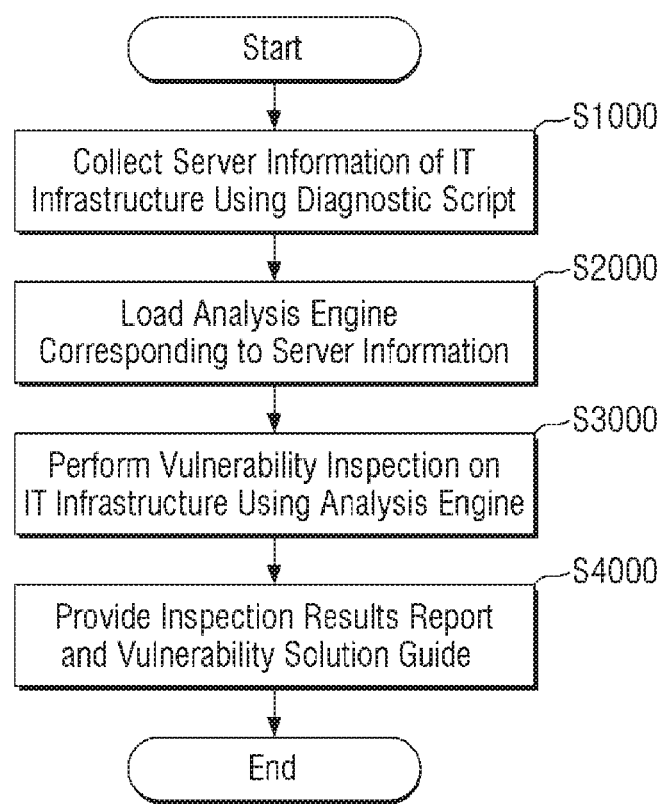
FIG. 15 is a flowchart illustrating an infrastructure diagnostic method according to an exemplary embodiment of the present disclosure.

FIG. 15 is a flowchart illustrating an infrastructure diagnostic method according to an exemplary embodiment of the present disclosure.

First, a diagnostic tool is provided to a user who uses the diagnostic portal 10. The diagnostic tool includes a search script for searching for a target to be diagnosed from a target system and a collection script for collecting system information of a target operating server. Alternatively, in response to the user logging on to the diagnostic portal 10 and entering IP information of the target system or the target operating server, the search script may be automatically transmitted to, and run in, the target system or the target operating server.

Once the search script is run either manually by the user or automatically, a target to be diagnosed is automatically detected, and a collection script capable of collecting system information of the detected target is downloaded from the diagnostic portal 10 and is then run.

As a result, the diagnostic portal 10 may receive server information of IT infrastructure with the use of a diagnostic script (S1000). Thereafter, the diagnostic portal 10 transmits the collected system information to an analysis server 20. Alternatively, the diagnostic portal 10 may also perform the functions of the analysis server 20.

Thereafter, an analysis engine, which is based on rules in the XML format, is loaded (S2000). The analysis engine may vary depending on the type of the detected target. For example, checklists for diagnosing OSs, checklists for diagnosing DBs, checklists for diagnosing networks may all differ from one another.

After the loading of the analysis engine, server information collected using the analysis engine is diagnosed and inspected for vulnerabilities (S3000). The results of the inspection are provided to a user as a results report, and at the same time, vulnerabilities found by the inspection and a guide for addressing the found vulnerabilities are provided to the user (S4000).

Checklists are divided into the following five categories: 1) configuration; 2) defects and errors; 3) availability; 4) performance and capacity; and 5) operation. The checklists are used later to provide the user with a visualization of the vulnerabilities of each server of the IT infrastructure and to create a results report.

In a case in which the checklists are not met, guide information is matched to address problems associated with the unmet checklists. The checklists are divided into upper, intermediate, and lower classes according to their levels of importance. Guide information for addressing the checklists is divided into short-, medium-, and long-term solutions according to their levels of importance and difficulty.

An action guide that does not require physical manipulation may automatically transmit a guide script and may automatically run the guide script. Also, in the case of a guide requiring the installation of a solution, the user may receive, via the diagnostic portal 10, information regarding necessary solutions and feedback information indicating whether to apply each of the necessary solutions. If the user chooses a specific solution, billing may be performed accordingly. When the billing process is complete, the chosen solution may be automatically transmitted to, and installed and set in, the target operating server.

Figure 16:
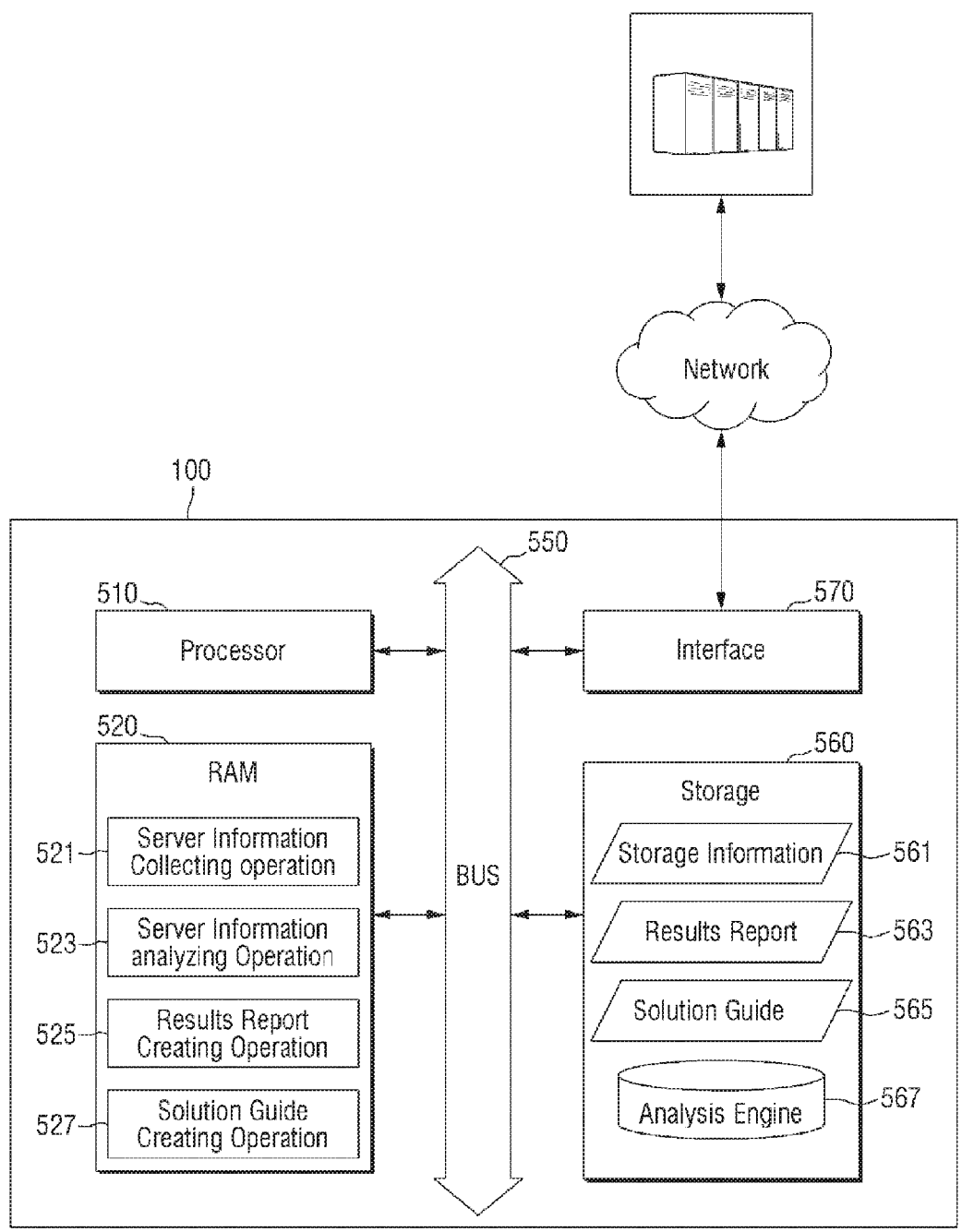
FIG. 16 is a schematic view illustrating the hardware configuration of an infrastructure diagnostic device according to an exemplary embodiment of the present disclosure.

FIG. 16 is a schematic view illustrating the hardware configuration of an infrastructure diagnostic device according to an exemplary embodiment of the present disclosure.

Referring to FIG. 16, a web-based IT infrastructure diagnostic service providing apparatus, i.e., the diagnostic portal 10, may include at least one processor 510, a memory 520, a storage 560, and an interface 570. The processor 510, the memory 520, the storage 560, and the interface 570 may exchange data with one another via a system bus 550.

The processor 510 may run a computer program loaded in the memory 520, and the memory 520 loads the computer program from the storage 560. The computer program may include a user ID information receiving operation (not illustrated), a server information collecting operation 521, a server information analyzing operation 523, a results report creating operation 525, and a solution guide creating operation 527.

The user ID information receiving operation receives ID information of a user who logs on to the diagnostic portal 10, via the interface 570. The user ID information receiving operation may also receive IP information of a target system or at least one target operating server of the target system, if necessary. The IP information of the target system or the target operating server may be used later to transmit an analysis script.

The server information collecting operation 521 receives system information from a collection script run in a server of IT infrastructure, via the interface 570. Then, the server information collecting operation 521 stores the received system information as server information 561 of the storage 560 via the system bus 550.

The server information analyzing operation 523 loads an analysis engine 567 corresponding to the server information 561 into the memory 520 via the system bus 550. After the loading of the analysis engine 567, which is based on rules in the XML format, the server information 561 is diagnosed and inspected for vulnerabilities by using the analysis engine 567.

Thereafter, the results report creating operation 525 visualizes vulnerabilities found in the process of determining whether checklists of the analysis engine 567 are met and provides the result of the visualization to the user as a results report. Also, the solution guide creating operation 527 searches for a solution guide 565 corresponding to the found vulnerabilities from the storage 560 and provides the solution guide 565 to the user along with the results report.

Figure 17:
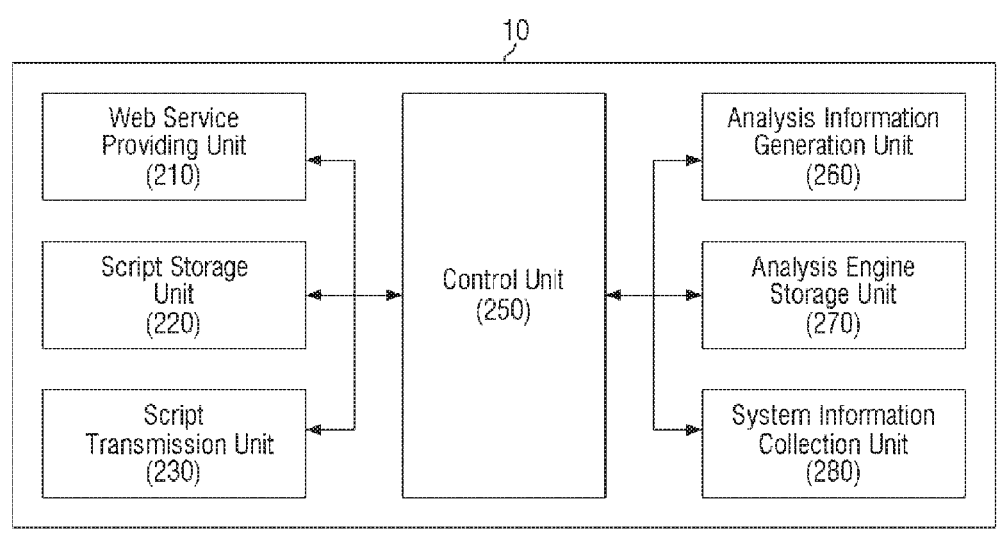
FIG. 17 is a schematic view illustrating the configuration of an infrastructure diagnostic system according to an exemplary embodiment of the present disclosure

FIG. 17 is a schematic view illustrating the configuration of an infrastructure diagnostic system according to an exemplary embodiment of the present disclosure.

Referring to FIG. 17, the infrastructure diagnostic system may include a web service providing unit 210, a script storage unit 220, a script transmission unit 230, a control unit 250, an analysis information generation unit 260, an analysis engine storage unit 270, and a system information collection unit 280.

The web service providing unit 210 may provide a web service to a user via port 80. That is, the web service providing unit 210 handles the processes of logging on to the diagnostic portal 10 and applying for diagnosis. In order to apply for diagnosis, the user needs to enter information regarding a target operating server that he or she manages and wishes to have diagnosed, i.e., IP information of the target operating server. If necessary, the user may also need to enter his or her account information for accessing the target operating server.

In response to the user entering the information regarding the target operating server and applying for diagnosis via the web service providing unit 210, the control unit 250 loads an analysis script stored in the script storage unit 220. Particularly, the control unit 250 loads a search script first. Thereafter, the control unit 250 transmits the search script to the target operating server via the script transmission unit 230 and automatically runs the search script in the target operating server.

Then, the search script is run in the target operating server and searches for an OS and programs installed in the target operating server. Thereafter, the search script sends a request for a collection script suitable for the OS and the programs of the target operating server. Then, the control unit 250 loads a collection script stored in the script storage unit 220. Thereafter, the control unit 250 transmits the loaded collection script to the target operating server via the script transmission unit 230 and runs the loaded collection script in the target operating server.

Then, system information is collected from the target operating server by the collection script run in the target operating server, and the collected system information is transmitted to the diagnostic portal 10. The system information collection unit 280 receives the system information transmitted to the diagnostic portal 10. The received system information may be stored in a DB (not illustrated), if necessary.

Thereafter, the analysis information generation unit 260 loads checklists, which are stored in the XML format, from the analysis engine storage unit 270 and performs vulnerability analysis using the loaded checklists. Then, the analysis information generation unit 260 may provide the results of the vulnerability analysis to the user along with an action guide for addressing vulnerabilities found by the vulnerability analysis.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A diagnosis and analysis method of an infrastructure diagnostic system, the diagnosis and analysis method comprising:

receiving, by the infrastructure diagnostic system, identification (ID) information of a user who manages a target system including at least one target operating server;

receiving, by the target system, a search script from the infrastructure diagnostic system;

transmitting, by the target system, a collection script corresponding to the at least one target operating server searched by running the search script to the at least one target operating server;

transmitting, by the at least one target operating server, system information collected by running the collection script, to the infrastructure diagnostic system;

receiving, by the infrastructure diagnostic system, system information of the target system or the at least one target operating server;

classifying, by the infrastructure diagnostic system, the target system or the at least one target operating server based on the system information according to predefined criteria;

selecting, by the infrastructure diagnostic system, an analysis module including at least one analysis rule corresponding to the target system or the at least one target operating server based on results of the classifying; and generating, by the infrastructure diagnostic system, analysis information regarding the target system or the at least one target operating server by executing the selected analysis module.

2. The diagnosis and analysis method of claim 1, wherein the generating the analysis information, comprises:

extracting at least one analysis item from among "configuration", "defects and errors", "availability", "performance", "access log", and "capacity" from the analysis rule; and determining whether the system information meets criteria of the extracted analysis item.

3. The diagnosis and analysis method of claim 1, wherein the analysis information concerns at least one among a grade, fitness, security level, and optimization level of each analysis item for the target system or the at least one target operating server.

4. The diagnosis and analysis method of claim 3, wherein the analysis information further includes action guide information corresponding to the grade, fitness, security level, or optimization level of each analysis item.

5. The diagnosis and analysis method of claim 4, wherein the action guide information includes grade information, and the grade information is classified according to whether restart request information for a target device is included in the action guide information.

6. The diagnosis and analysis method of claim 5, further comprising generating a guide script including execution information corresponding to the action guide information in response to restart request information not being included in the action guide information; and transmitting the guide script to the target device.

7. The diagnosis and analysis method of claim 6, further comprising storing the analysis information and the action guide information in association with the ID information of the user.

8. The diagnosis and analysis method of claim 3, further comprising selecting at least one solution corresponding to the action guide information; and providing the selected solution to the user.

9. The diagnosis and analysis method of claim 8, further comprising registering the selected at least one solution with a solution registration device;

receiving feedback information indicating whether the selected at least one solution is selected by the user; and transmitting, by the infrastructure diagnostic system, a solution corresponding to the target system or the at least one target operating server with reference to the feedback information.

10. The diagnosis and analysis method of claim 9, further comprising transmitting billing information to the target system or a solution registrant for the solution transmitted by the infrastructure diagnostic system, according to predefined criteria.

* * * * *